United States Patent
Ho et al.

(10) Patent No.: US 7,292,598 B2
(45) Date of Patent: Nov. 6, 2007

(54) ADAPTIVE ALGORITHMS FOR OPTIMAL CONTROL OF CONTENTION ACCESS

(75) Inventors: Jin-Meng Ho, Plano, TX (US); Donald P. Shaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1108 days.

(21) Appl. No.: 09/966,635

(22) Filed: Sep. 28, 2001

(65) Prior Publication Data

US 2002/0110085 A1    Aug. 15, 2002

Related U.S. Application Data

(60) Provisional application No. 60/256,421, filed on Dec. 18, 2000.

(51) Int. Cl.
*H04L 12/43* (2006.01)
(52) U.S. Cl. .................................. 370/461; 370/230
(58) Field of Classification Search ................ 370/230, 370/252, 444, 445, 447, 448, 462, 461, 468
See application file for complete search history.

(56) References Cited

U.S. PATENT DOCUMENTS

| | | | |
|---|---|---|---|
| 4,707,829 A | * | 11/1987 | Pendse ........................ 370/445 |
| 4,771,391 A | | 9/1988 | Blasbalg |
| 5,517,501 A | * | 5/1996 | Jacquet et al. ............... 370/447 |
| 5,729,542 A | * | 3/1998 | Dupont ........................ 370/346 |
| 5,852,723 A | | 12/1998 | Kalkunte et al. |
| 6,157,627 A | * | 12/2000 | Olofsson et al. ............. 370/329 |
| 6,418,136 B1 | * | 7/2002 | Naor et al. .................. 370/347 |
| 6,614,799 B1 | * | 9/2003 | Gummalla et al. .......... 370/448 |
| 6,791,996 B1 | * | 9/2004 | Watanabe et al. ........... 370/447 |

FOREIGN PATENT DOCUMENTS

EP    0 709 982 A1    5/1996

OTHER PUBLICATIONS

*Information Technology-Telecommunications and Information Exchange Between Systems-Local and Metropolitan Area Networks-Specific Requirements, Part II: Wireless LAN Medium Access Control (MAC) and Physical Layer (PHY) Specifications, Chapter 9,* ISO/IEC 8802-11 ANS/IEEE STD 802.11, 1999, pp. 70-97, XP002236335.

* cited by examiner

*Primary Examiner*—Huy D. Vu
*Assistant Examiner*—Christine Ng
(74) *Attorney, Agent, or Firm*—Steven A. Shaw; W. James Brady; Frederick J. Telecky, Jr.

(57) ABSTRACT

Contention for a shared communications medium in a communications network involves a fine balancing act between wasting much network bandwidth sitting idle or recovering from collisions and transmitting data. Contention adaptation concepts are introduced for access to a shared medium, and adaptive algorithms for contention access using probabilities and backoffs are presented.

16 Claims, 5 Drawing Sheets

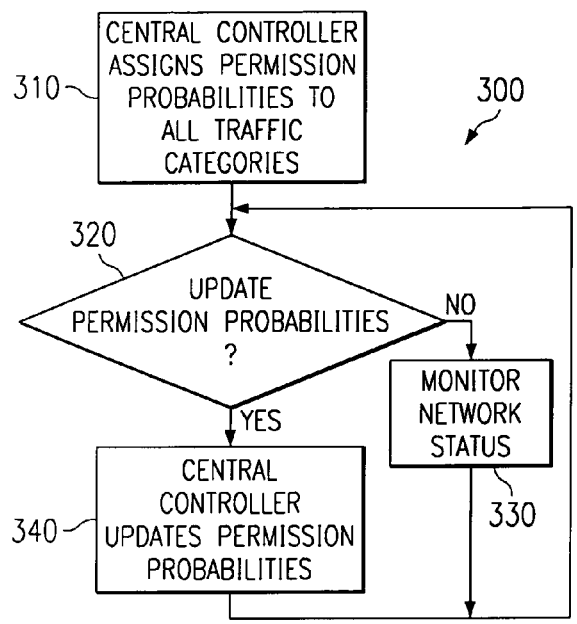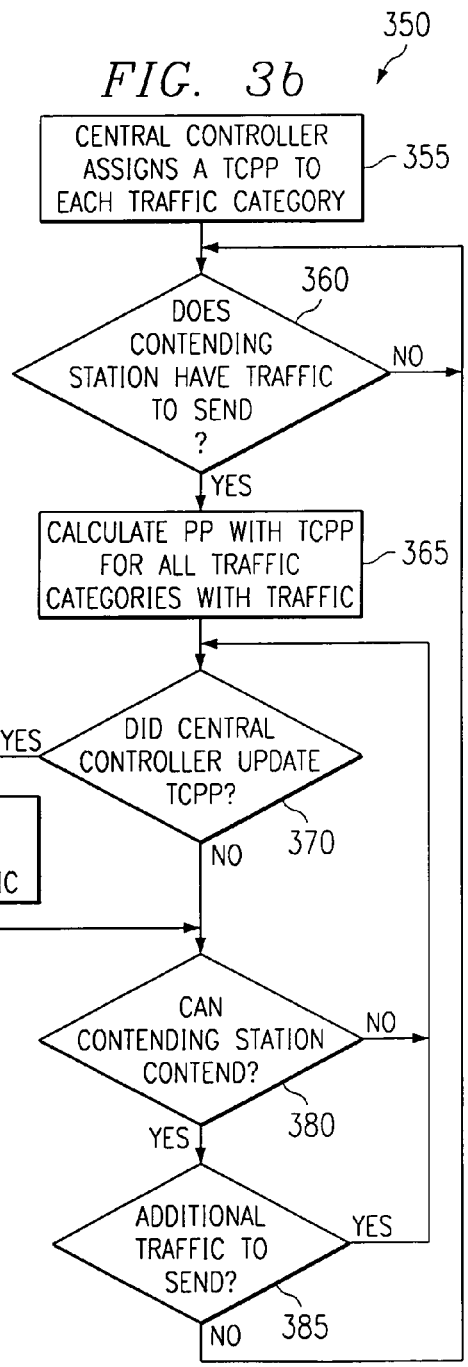

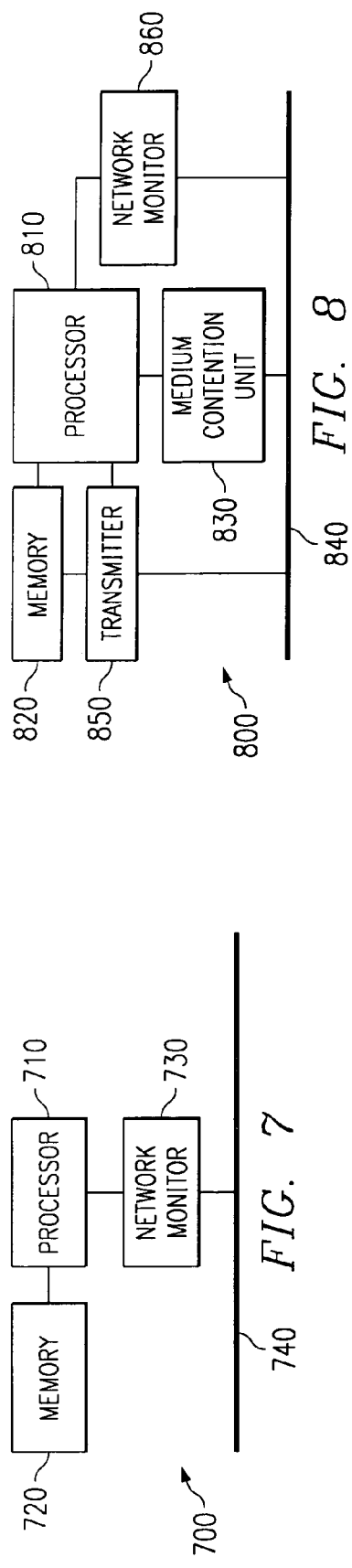
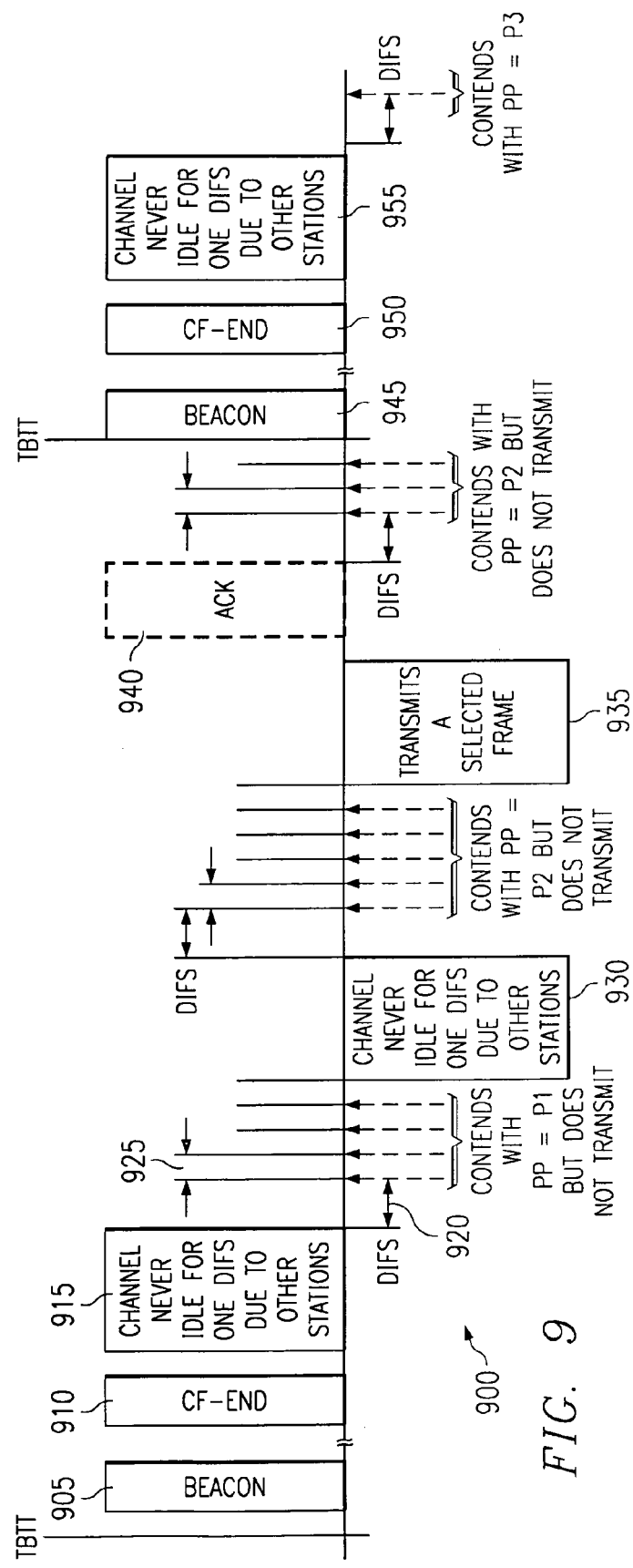

ADAPTIVE ALGORITHMS FOR OPTIMAL CONTROL OF CONTENTION ACCESS

CROSS REFERENCE TO RELATED APPLICATIONS

This application claims priority to the provisional application entitled "Adaptive Algorithms for Optimal Control of Contention Access", filed Dec. 18, 2000, Ser. No. 60/256,421, which provisional application is incorporated herein by reference.

This invention is related to commonly-assigned patent applications: "Unified Channel Access for Supporting Quality of Service (QoS) in a Local Area Network", filed Sep. 28, 2001, Ser. No. 09/677,164, now U.S. Pat. No. 7,058,074, and "Shared Communications Channel Access In an Overlapping Coverage Environment", filed Sep. 28, 2001, Ser. No. 09/966,393, now abandoned. These applications are incorporated herein by reference in their entirety.

FIELD OF THE INVENTION

This invention relates generally to networks and more particularly to communications networks that share access of a common communications medium among multiple users.

BACKGROUND OF THE INVENTION

Communications networks use a communications medium to transmit information in the form of computer data, voice, music, video, etc., between users or between users and service providers. The communications medium may be a wire link, a fiber optic link, or a wireless link. The wireless link may include, but is not limited to, radio frequency, infrared, laser light, and microwave. The network may, in fact, use a combination of different communications links. With the exception of a small number of networks that use dedicated communications links between each user, most information networks use a shared communications medium to carry the transmitted information. Examples of information networks using a shared communications medium include: Ethernet, token ring, and wireless Ethernet (IEEE 802.11).

In networks that use a shared communications medium, access to the shared medium must be controlled to prevent a situation where a subset of users are able to dominate the medium and block other users from using the medium. Another situation that also must be prevented is that too many users attempt to transmit information simultaneously, leading to no user being able to successfully transmit any information at all because of information packets colliding with one another all over the network.

Some networks, such as Ethernet, do not prevent these situations. A user on an Ethernet network is free to transmit as much information (in the form of data packets) as fast and as soon as he is able to produce it as long as the medium is sensed to be idle. If a collision between two or more data packets from multiple users occurs, then a backoff mechanism comes into play permitting colliding users to recover from the collision and to reduce the probability of future collisions from occurring. This data anarchy works well in a network with a low to medium number of users, but latency and throughput performance degrades quite ungracefully as the number of users increases.

In a token ring network, a user can transmit data only if the user is in possession of a "token". The token is a special control packet that is transferred from one user to the next in a circular fashion, hence the name token ring. Whoever is in possession of the token is in control of the medium and can transmit data freely. However, token ring networks may be inefficient because users that have no data to transmit will still obtain the token and therefore waste valuable network bandwidth, while users with large amounts of data to transmit must wait for the token to make its way around the network before they can resume transmitting data.

In wireless Ethernet (IEEE 802.11), two types of medium sharing are provided. In a first type of medium sharing, called contention access, a user is free to transmit data if the user detects that the medium has been idle for a sufficient period of time. A second type of media sharing, called contention-free access, a centralized controller controls access to the medium. A user can only transmit data after it has been polled by the centralized controller. During contention-free access, the network behaves in a manner that is similar to a token ring network, and while during the contention period, the network behaves similarly to Ethernet. And in essence, wireless Ethernet combines features of both Ethernet and token ring networks.

In IEEE 802.11, the network designers are required to implement the contention access method but not necessarily the contention-free access method, since the former is specified to be mandatory and the latter is optional. According to the mandatory method, when a station has information to transmit, it checks the medium (for IEEE 802.11 in the United States, the medium spectrum are in the 2.4 and 5.2 GHz industrial-scientific-medical (ISM) frequency bands) to see if the medium is idle. The designers have defined two different states of idle. The first state of idle is known as "physical idle" and it is when there are no actual transmissions being performed on the medium. The second state of idle is known as "virtual idle" and it is when there are no anticipated transmissions from users in the network. Both states of idle must be met for the medium to be considered idle.

Prior to a new transmission, the user selects a random backoff time from an interval [0, CW), which includes 0 but excludes CW, where CW=CWmin+1 for a new transmission and CWmin is a predetermined value that is specified in the technical specifications. The interval is commonly referred to as a contention window. This randomly selected backoff time is placed into a backoff timer that begins decrementing after the medium is determined to have been idle for a DIFS interval, where DIFS is also a predetermined value defined in the standard. However, the backoff timer only decrements when the medium remains idle (both states of idle). If the medium is no longer idle, then the backoff timer stops decrementing; the backoff timer resumes decrementing after the medium has become idle for a DIFS.

Once the backoff timer reaches zero, the user transmits a frame. If a collision occurs, the user selects a new random backoff time from a contention window that is twice as large as the previous contention window, [0, 2*CW). After the backoff timer expires with the new backoff time, the user will transmit the same frame again. If the transmission fails yet again, the user selects another random backoff time from a contention window that is twice as large as the previous contention window, [0, 4*CW). When the contention window reaches a maximum range [0, CWmax], including both 0 and CWmax, where CWmax is yet another predetermined value specified in IEEE 802.11, the contention window will no longer increase in size, regardless of the occurrence of any future collisions of the frame. This backoff process is known as truncated binary exponential backoff and continues until the transmission is successful. The frame may be dropped if it reaches a retry limit or a maximum lifetime, which are values also defined by the IEEE 802.11 standard. After the frame is successfully transmitted or after the frame is dropped, the user will perform a new backoff chosen from the initial contention window [0, CW), with CW=CWmin+ 1, in preparation for the transmission of another new frame.

A disadvantage of the truncated binary exponential backoff process for contention access is that it does not differentiate the current load on the network, e.g., it always doubles the contention window whether there are two or more users colliding with one another. The truncated binary exponential backoff process is not adaptive to the network condition. By not being adaptive, the truncated binary exponential backoff process operates in the same way, regardless of network load and condition. This may result in a user having to wait an inordinate amount of time in a lightly loaded network when there are ample opportunities to transmit. Another disadvantage of the truncated binary exponential backoff process is its poor throughput and latency performance with increased contention, due to each user with data to transmit automatically being required to use the same truncated binary exponential backoff process for a new or retry transmission.

A need has therefore arisen for an adaptive methodology for providing optimal control of contention access to a shared medium in response to network load changes.

SUMMARY OF THE INVENTION

In one aspect, the present invention provides a method for adaptively controlling network traffic load in a communications network by first measuring the network traffic load and calculating network performance metrics based on the measured traffic load, and adjusting the network traffic load.

In another aspect, the present invention provides a method for controlling contention access to a shared communications medium by assigning a set of permission probabilities for each different traffic category supported in the network, and then an overall permission probability is calculated by each user station based on the traffic categories with traffic to send from that station. The stations must then contend with one another for access to the communications medium using their respective overall permission probabilities. Once given access, the station is permitted to transmit the data. During this time, the permission probabilities are updated according to current network loading conditions. This process is repeated until the traffic has been transmitted.

The present invention has a principal advantage in that it permits dynamic and adaptive control of contention access to a shared medium in an information network through a combination of centralized and distributed mechanisms. The present invention does not require a significant amount of communication between stations and an algorithm controller (in the case of the centralized method) in the network. In the case of the distributed method, no communication between the stations is needed.

The present invention has an additional advantage in that it makes better use of available medium idle times to transmit data, rather than letting those times remain idle.

The present invention has yet another advantage in that it gives preferential treatment to higher priority traffic categories of network traffic to ensure that they are granted access to the network sooner than lower priority traffic categories of network traffic.

BRIEF DESCRIPTION OF THE DRAWINGS

The above features of the present invention will be more clearly understood from consideration of the following descriptions in connection with accompanying drawings in which:

FIG. 3a is a diagram displaying an adaptive, centralized contention access algorithm executing on a hybrid controller, according to a preferred embodiment of the present invention;

FIG. 3b is a diagram illustrating an adaptive, centralized contention access algorithm executing on a wireless station, according to a preferred embodiment of the present invention;

FIG. 7 is a diagram illustrating an access point with built-in support for centralized contention access according to a preferred embodiment of the present invention;

FIG. 8 is a diagram illustrating a station with built-in support for both centralized and distributed contention access according to a preferred embodiment of the present invention;

FIG. 9 is a time-space diagram illustrating the operation of a probability-based medium contention algorithm according to a preferred embodiment of the present invention; and

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Sharing a communications medium is a necessity for a majority of the communications networks (networks) available today. Only in a small number of networks are there enough resources to permit dedicating communications media between pairs of users. For most purposes, dedicating a connection between pairs of users is an inefficient use of bandwidth resources. Sharing a communications medium between multiple users allow for more efficient use of the medium, because when one user may be idle, another user may have data to transmit. Sharing is also more cost efficient because a smaller amount of the media is needed to support the information network. Note that this is also true for wireless, over-the-air networks, where if sharing were not used, then more "air", i.e., spectrum, must be dedicated to supporting the network.

However, sharing a communications medium means that in certain circumstances, more than one user could desire access to the medium at the same time or a user may desire access when the medium is already busy. This is known as contention. Many different methods for dealing with contention have been used, from not dealing with contention at all (such as an Aloha protocol) to giving only one user access to the medium at a time (such as a token ring protocol).

Figure 1:
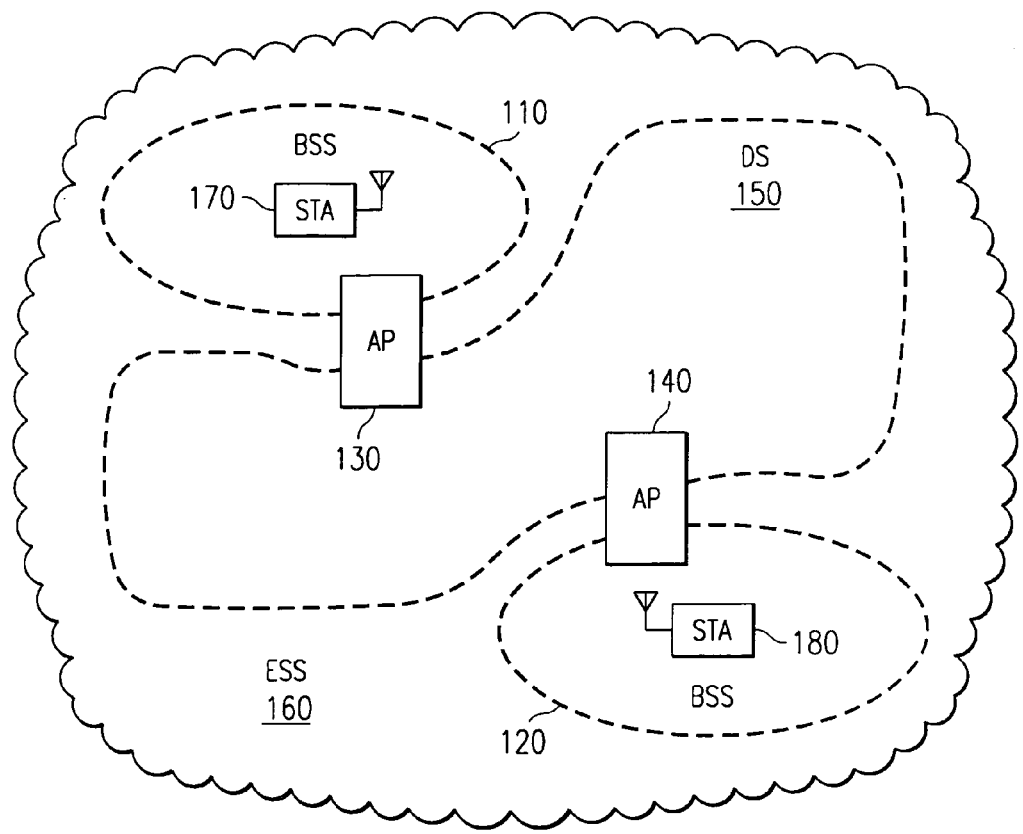
FIG. 1 is a diagram displaying a typical (prior art) configuration of a wireless local area network.

Referring now to FIG. 1, a diagram (prior art) of a typical wireless local area network (LAN) installation according to the IEEE 802.11 technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications", which is incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set (ESS) 160. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

As shown in FIG. 1, BSS 110 is connected to DS 150 via the access point 130 and the second access point 140 connects DS 150 to BSS 120. It should be noted that an access point also contains a wireless station and can be addressed like any other wireless station.

Stations within a BSS, for example, stations 130 and 170 in BSS 110, may communicate with one another without interfering with stations in other BSSs. However, the stations within a BSS cannot simply communicate whenever they wish; they must follow an established set of rules designed to minimize collisions and maximize performance.

A user may be thought of as a device or an entity that uses a station to communicate with other users who are using other stations to communicate. Therefore, in the remainder of this discussion, the terms stations and users will be used interchangeably without loss of information.

As described previously, a station may communicate in one of two ways. The station may communicate during a contention-free period after being polled by a centralized controller. The centralized controller may be a component of an access point or it may be a separate entity on the network. However, the centralized controller should be part of the same BSS as the stations that it is controlling. Communications during the contention-free period is ensured to be free of collisions because only one station within a given BSS has access to the communications medium at a given time. Once the station has been polled, it is given access to the medium for transmitting up to a maximum amount of information to any destination.

Alternatively, the station may attempt transmissions during a contention period. In order to transmit during the contention period, the station must first determine if the medium is idle and its backoff timer must have expired. If either condition is not met, then the station cannot transmit. However, even if both conditions are met, collisions may still occur, since more than one station may have attempted to transmit at the same time. Transmissions during the contention period typically are afflicted with collisions that will require retransmissions after extended delays.

Figure 2:
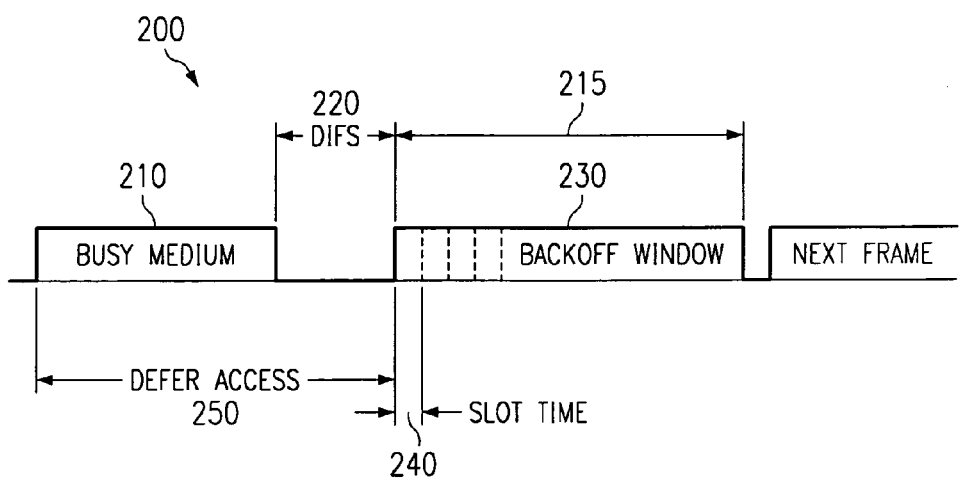
FIG. 2 is a time-space diagram displaying contention access (prior art) during a contention period in a wireless local area network.

Referring now to FIG. 2, a time-space diagram (prior art) illustrates communications during the contention period according to the IEEE 802.11 technical specifications. FIG. 2 displays a time-space diagram 200 of the communications medium as a function of time. The time-space diagram shows that for a period of time, the communications medium is busy (block 210) and for another period of time, the communications medium is idle (time span 215). A third time span 220 is referred to as a Distributed Coordinating Function (DCF) inter-frame space (DIFS).

The DIFS is a medium idle time span that triggers stations communicating by contention access to transmit data if their backoff timers are zero or to decrement their backoff timers if their backoff timers are not zero. The station considers its transmission successful if it receives an acknowledgment from the addressed station within a short inter-frame space (SIFS) of the end of that transmission, where the value of SIFS is also defined in the 802.11 standards.

A station communicating during the contention period can transmit if it has determined that the medium is idle at a DIFS boundary and if its backoff timer has expired. Another way to view a DIFS is that if the medium has been idle (both physically and virtually) for a DIFS period, then a station is free to contend for the medium, granted that its backoff counter has expired.

During the busy period 210, no other station is allowed access of the medium, therefore, they must defer access (span 250). During the idle period 230, a station is free to transmit if its backoff timer is zero. If its backoff timer is not zero, then the backoff timer is decremented as each time slot 240 expires and if the medium remains idle. If the medium is busy, the backoff timer is frozen, regardless of how many time slots 240 expire. The backoff timer may resume its countdown after the medium is determined to become idle once again. The backoff timer does not start counting down until one DIFS period after the medium becomes idle.

The present invention, as described below, is a replacement for the existing contention access algorithm in the IEEE 802.11 technical standard. Therefore, for discussion purposes, terminology used in the discussion will reflect terminology used in the IEEE 802.11 technical standard. However, the ideas embodied in the present invention have application in other information networks where multiple users share a communications medium. Therefore, the present invention should not be construed as being applicable only to a wireless network that adheres to the IEEE 802.11 technical standard.

Referring now to FIG. 3a, a block diagram illustrates an adaptive, centralized contention access algorithm 300 executing on a hybrid controller, according to a preferred embodiment of the present invention. According to a preferred embodiment of the present invention, the algorithm 300 executes on a hybrid controller (HC). An HC is responsible for managing bandwidth usage in the wireless network and network operations during both the contention-free period and the contention period and for both contention-free and contention access. The HC is analogous to the centralized controller discussed previously, although the HC typically has more functionality. In many instances the terms HC and centralized controller are used interchangeably. Usually, there is one HC per BSS and the HC is normally located inside an access point (AP). An access point containing an HC is commonly referred to as an enhanced access point (EAP).

The algorithm 300 begins during initiation of the wireless network by assigning permission probabilities to each traffic category supported in the wireless network (block 310). According to a preferred embodiment of the present invention, the values assigned to the different traffic categories are predetermined values that were specified during the configuration of the wireless network. Being probabilities, each traffic category permission probability (TCPP) lies within the range [0, 1]. The range [0, 1] denotes that the TCPP can have a value between 0 and 1, including 0 and 1, although TCPP will generally be much smaller than 1 in practice. Additionally, traffic categories with higher priorities are assigned larger TCPPs. According to another preferred embodiment of the present invention, during the course of wireless network operation, the TCPPs may change to reflect the medium loading status. According to yet another preferred embodiment of the present invention, as the TCPPs are changed, the TCPPs are saved into memory, so that the next time the wireless network is re-initialized, the saved TCPPs can be restored and used instead of the default initial values.

Traffic categories are a partitioning of data traffic carried on the wireless network in a prioritizing technique to support quality of service (QoS) transfers of the data traffic between stations inside a BSS. QoS support is needed to ensure that certain classes of network traffic, such as voice traffic or video traffic, receive sufficient preferential treatment so that the network is able to deliver a usable level of communications. For example, according to a preferred embodiment of the present invention, data traffic on the wireless network may be categorized into one of at least eight different categories. The level of service received by the data is determined by the category into which it is placed. According to a preferred embodiment of the present invention, the permission probabilities for the different traffic categories sum up to be less than or equal to one (1.0).

After the algorithm 300 assigns the initial values to the permission probabilities for the different traffic categories, the algorithm 300 enters an update phase of operation (blocks 320 and 330) where it monitors the medium to keep track of network performance. If the network is not performing well, then the algorithm 300 modifies the TCPPs to change the load on the medium. If the load to the medium is too light (assuming that there is sufficient traffic), the TCPPs will be assigned larger values, and hence the load on the medium will become heavier. On the other hand, if the load to the medium is too heavy, the TCPPs will be assigned smaller values, and the load on the medium will become lighter. That is, the algorithm is self-adaptive. However, according to a preferred embodiment of the present invention, the algorithm 300 does not need to update the TCPPs immediately after an event (such as an idle, a successful transmission, or a collision) occurs on the medium. Instead, the algorithm 300 waits until an update interval expires. Once an update interval expires, the algorithm 300 updates the TCPPs for the stations.

According to a preferred embodiment of the present invention, the update intervals are fixed time intervals. When one of the fixed update intervals expires, the algorithm 300 updates the TCPPs. If the TCPPs are wrong for the current network conditions, the TCPPs will be corrected when the next update interval starts.

According to another preferred embodiment of the present invention, the algorithm 300 maintains network performance data for several update intervals and uses data from the multiple update intervals in determining the updates to the TCPPs. The data from the different update intervals may be weighed differently. For example, data from the most recent update interval may be weighed more than data from the oldest update interval. Alternatively, data from each update interval may be weighed equally. Inclusion of multiple update intervals may prevent the TCPPs, and hence the resulting traffic load to the medium, from oscillating between very large and very small values.

According to another preferred embodiment of the present invention, the update intervals are not fixed time intervals. Instead, the algorithm 300 monitors the network performance. The algorithm 300 calculates metrics of is the network performance and uses these metrics to determine when to update the TCPPs. For example, if it notices that the ratio of idle time to collision time has gone askew, the algorithm 300 can update the TCPPs to tweak the network performance.

According to a preferred embodiment of the present invention, updates are performed when metrics of network performance fall outside of an acceptable range. One metric of network performance is a ratio of an amount of time the medium is in an idle state to an amount of time the medium is in a collision state. Optimal performance is obtained when the ratio is approximately equal to one. According to a preferred embodiment of the present invention, if the ratio falls outside of the range (1−epsilon, 1+epsilon), where epsilon is some predetermined threshold value, then the algorithm 300 will update the TCPP values. For example, if the amount of time the medium wastes on idles is less than the amount of time the medium wastes on collisions, an indication of the medium being overloaded, then the algorithm 300 will decrease the values of the TCPPs. By decreasing the values of the TCPPs, the amount of traffic in the network is reduced, therefore reducing the number and frequency of collisions and hence the amount of time the medium wastes on collisions.

Referring now to FIG. 3b, a block diagram illustrates an adaptive, centralized contention access algorithm 350 executing on a wireless station, according to a preferred embodiment of the present invention. The algorithm 350 is an analogue to the algorithm 300 displayed in FIG. 3a. The algorithm 300 from FIG. 3a executes on the hybrid controller while the algorithm 350 executes on a wireless station. According to a preferred embodiment of the present invention, each station in a BSS executes a copy of the algorithm 350.

The algorithm 350 begins in block 355 where it accepts the initial assignments of the permission probabilities for each of the traffic categories from the hybrid controller. After receiving the TCPPs, the station becomes idle if it does not have any traffic to transmit. The station waits in block 360 until it has some traffic to transmit.

When the station has some traffic to transmit, it categorizes the traffic and places them into queues, ideally one queue per traffic category. The station then calculates an overall permission probability, PP, by summing up all the individual permission probabilities for the particular traffic categories for which it has traffic (block 365). For example, if the station has traffic in categories 1, 2 and 5, then the overall permission probability, PP, is the summation of the TCPPs for traffic categories 1, 2, and 5.

After calculating the overall permission probability, PP, the station checks to see if the hybrid controller updated the TCPPs (block 370). If it has, then the station recalculates the overall permission probability, PP (block 375). The algorithm 350 then defines contention for access to the medium (block 380). The contention access algorithm will be discussed below. If contention was permitted, then the station is able to transmit some of the traffic that it has queued. Since some traffic was transmitted, the station must check to see if there is any additional queued traffic (block 385). If there is additional queued traffic, then the algorithm 350 returns to block 370. If there is no additional queued traffic, then the algorithm 350 returns to block 360 to wait for new traffic to transmit. If contention was not permitted, then none of the queued traffic is transmitted and the algorithm 350 returns to block 370.

Figure 4:
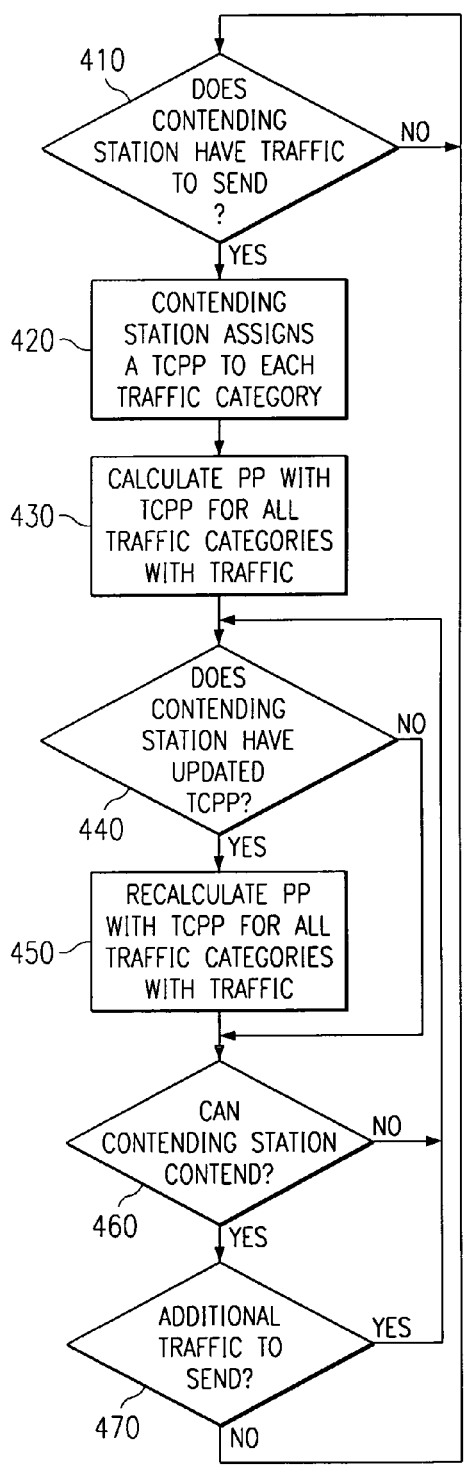
FIG. 4 is a diagram illustrating an adaptive, distributed contention access algorithm according to a preferred embodiment of the present invention.

Referring now to FIG. 4, a block diagram illustrates an adaptive, distributed contention access algorithm 400 according to a preferred embodiment of the present invention. The algorithms 300 and 350 illustrated in FIGS. 3a-b and discussed above were centralized algorithms, meaning that there was a centralized controller, referred to as the hybrid controller, which either controlled the operation of the algorithms or provided data/information that controlled the operation of the algorithms. The algorithm 400 is a distributed algorithm, meaning that there is no centralized controller and the algorithm 400 controls itself with no input (other than data traffic) from external sources.

According to a preferred embodiment of the present invention, the algorithm 400 executes on each of the stations in the network. The algorithm 400 begins with the contending station checking to see if the station has any traffic to transmit (block 410). If the station does not have any traffic to transmit, the algorithm 400 remains in block 410, waiting for traffic to arrive in the station. If the station does have traffic to transmit, it places the traffic into queues according to their traffic categories and assigns a permission probability for each traffic category with traffic in its queue (block 420). Traffic categories with no traffic have their permission probabilities set to zero.

After placing the traffic in queues, the station calculates an overall permission probability, PP, by performing a summation of the TCPPs (block 430). The station adds up the permission probabilities for all traffic categories with traffic in its queue. For example, if the station has traffic in categories 1, 2 and 5, then the overall permission probability, PP, is the summation of the TCPPs for traffic categories 1, 2, and 5. Equivalently, because the traffic categories with no queued traffic had their TCPPs set to zero, summing their TCPPs with the non-zero TCPPs has no net effect on the overall permission probability, PP. In block 440, the station checks if the algorithm 400 has updated any of the TCPPs since it performed the summation. If the algorithm has updated the TCPPs, then the station recalculates the overall permission probability, PP (block 450).

Being a distributed algorithm, there is no centralized controller to provide updates for the TCPPs. Instead, the algorithm 400 provides its own updates. With the station monitoring the network performance and the performance of the traffic that it is transmitting, the algorithm 400 makes adjustments to the values of the TCPPs. According to a preferred embodiment of the present invention, only stations with queued traffic perform the updates to the TCPPs.

According to another preferred embodiment of the present invention, only traffic categories with queued traffic are eligible to be updated by the algorithm 400 and traffic categories with no queued traffic have zeros (0) for their TCPPs and are not updated. The algorithm 400 uses various metrics to help it determine how it should adjust the TCPPs.

According to a preferred embodiment of the present invention, the update intervals are fixed time intervals. When one of the fixed update intervals expires, the algorithm 400 updates the TCPPs. If the TCPPs are incorrect for the current network conditions, the TCPPs will be corrected when the next update interval starts.

According to another preferred embodiment of the present invention, the update intervals are not fixed time intervals. Instead, when the algorithm 400 monitors the network performance, if it notices that the ratio of idle time to collision time has gone askew, the algorithm 400 can update the TCPPs to tweak the network performance.

According to a preferred embodiment of the present invention, one metric of network performance is a ratio of an amount of time the medium is in an idle state to an amount of time the medium is in a collision state. Optimal performance is obtained when the ratio is approximately equal to one. According to another preferred embodiment of the present invention, if the ratio falls outside of the range (1−epsilon, 1+epsilon), where epsilon is some predetermined threshold value, then the algorithm 400 will adjust the TCPP values. For example, If the amount of time the medium wastes on idles is greater than the amount of time the medium wastes on collisions, then the algorithm 400 will increase the values of the permission probabilities. This would lead to more traffic in the network, reducing the medium idle time and hence improving the network utilization.

Another network performance metric that a station can use to measure performance is the relative performance of the traffic that the station itself transmits. If a large amount of the traffic that the station transmits results in collisions, the station can reduce the TCPPs for the traffic categories involved to reduce the amount of traffic that it is sending. This will reduce the overall traffic in the network and reduce the collision rate. This particular metric is relatively simple to monitor since the station knows the traffic that it transmits and which one had collisions.

The algorithm 400 then defines contention for access to the medium (block 460). The contention access algorithms will be discussed below. If contention was permitted, the station is able to transmit some of the traffic that it has queued. Since some traffic was transmitted, the station must check to see if there is any additional queued traffic (block 470). If there is additional queued traffic, then the algorithm 400 returns to block 440. If there is no additional queued traffic, then the algorithm 400 returns to block 410 to wait for new traffic to arrive in the station for transmission. If contention was not permitted, none of the queued traffic is transmitted and the algorithm 400 returns to block 440.

Contention for access to the communications medium is crucial in a network where multiple users share the communications medium. If the algorithm for contention access is not designed properly, then a significant amount of the network's available bandwidth is wasted, either on collisions between data frames transmitted by multiple users or sifting idle due to no transmissions at all.

The IEEE 802.11 technical standard specifies a contention access algorithm that uses what is known as truncated binary exponential backoff to reduce and resolve collisions. Before a station has traffic to transmit, the station must select a random backoff time from a contention window [0, CW), which includes 0 but excludes CW, where CW=CWmin+1 and CWmin is a value specified in the technical standard. The random backoff time is placed into a backoff counter. The backoff counter counts down each time a medium idle slots passes, i.e., the backoff counter does not decrement if the medium becomes busy while the station is waiting for transmission. However, the backoff counter does not begin or resume counting down until the medium has become idle for a DIFS period, a value also specified in the technical standard. The station transmits once the backoff counter reaches zero. If a collision occurs, the station must select another random backoff time from a contention window [0, 2*CW). If collisions continue to occur, the contention window continues to double in size each time a collision occurs, but will not exceed a maximum size [0, CWmax], where CWmax is another value defined in the technical specifications.

While the contention access algorithm stated in the technical standard works for light and moderate medium loads, it is inefficient, and may even break down, with increased load. The time spent in waiting for the expiration of the backoff timers results in a significant amount of network bandwidth wasted on idles at low medium loads and a significant amount of network bandwidth wasted on collisions at high medium loads. This is because the contention access algorithm does not account for the overall medium loading from all the stations active in the BSS.

Figure 5A:
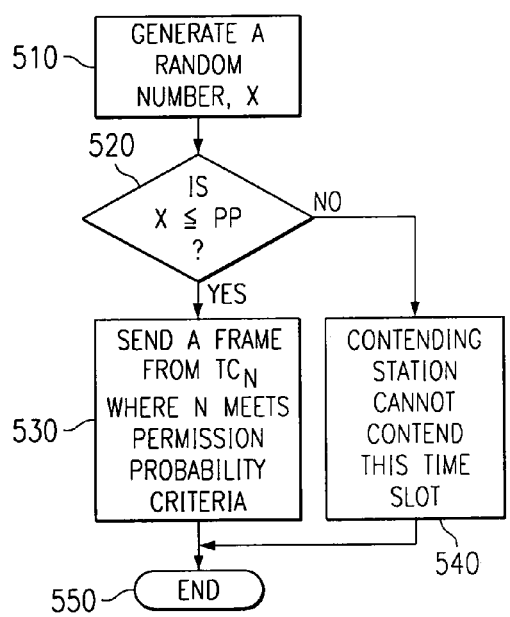
FIG. 5a is a diagram illustrating a probability-based medium contention algorithm according to a preferred embodiment of the present invention.

Referring now to FIG. 5a, a block diagram illustrates a probability-based medium contention algorithm 500 according to a preferred embodiment of the present invention. According to a preferred embodiment of the present invention, the contention algorithm 500 executes on each station with traffic to transmit. The contention algorithm 500 is present on each station in the network, but is only active on stations with traffic to transmit. The contention algorithm 500 is an example of a contention algorithm that would be used in blocks 380 from FIG. 3b and 460 from FIG. 4 to obtain access to the communications medium and to transmit data if access to the medium was obtained.

The contention algorithm 500 begins with the contending station generating a random number, X(block 510). According to a preferred embodiment of the present invention, the random number, X, is generated from a random variable uniformly distributed over an interval [0, 1]. Random numbers with other types of distributions, such as, exponential, chi squared, Gaussian, etc., may also be used, but their skewed distributions tend to result in the favoring of certain transmissions over others. After generating the random number, X, the contending station compares it with the overall permission probability, PP, in block 520. The overall permission probability, PP, was calculated in steps 365 from FIG. 3b and 430 from FIG. 4 and is the summation of individual permission probabilities for traffic categories with which there is queued traffic.

If the random number, X, is less than or equal to the overall permission probability, PP, then the station is permitted to access the communications medium. The station sends traffic from a traffic category N where N is selected from the following criteria (block 530):

if $0 < X \leq TCPP_{+0}$, then $N=0$; else if $\sum_{i=0}^{M-1} TCPP_i < X \leq \sum_{i=0}^{M} TCPP_i$, where $1 \leq M \leq 7$, then $N = M$, where $1 \leq M$.

Here, $TCPP_{+i}$ is the permission probability for traffic category i and is set to zero if traffic category i has no traffic to send from the station. The above expressions can be simpler stated as, traffic in category N will be transmitted if X lies within an interval $$\left[ \sum_{i=0}^{N-1} TCPP_i, \sum_{i=0}^{N} TCPP_i \right].$$

There is a special case for N=0, where the interval is (0, $TCPP_{[1]0}$]. After transmitting the traffic, the contention algorithm 500 ends (block 550).

Figure 5B:
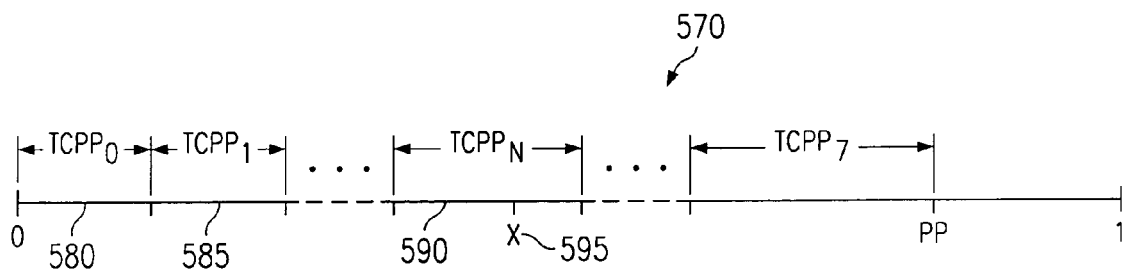
FIG. 5b is a diagram graphically illustrating an algorithm for selecting traffic from a particular traffic category to transmit according to a preferred embodiment of the present invention.

Referring now to FIG. 5b, a diagram graphically illustrates the above criteria for selecting the traffic category, N, depending upon the random number, X. A number line 570 displays an interval between 0 and 1. The number line 570 displays several segments, where each segment is equal to a traffic category permission probability. A first segment 580 represents the TCPP for traffic category 0, while a second segment 585 represents the TCPP for traffic category 1. A third segment 590 represents the TCPP for traffic category N. Note that the end for the final segment does not need to line up with the end of the number line. The end of the final segment is equal to the overall permission probability, PP.

A tick mark 595 represents a location of the random number, X, on the number line 570. Since the tick mark 595 lies within the segment 590 representing the TCPP for traffic category N, then the station can send traffic from traffic category N.

Should the random number, X, be greater than the overall permission probability, PP, then the station is not permitted to access the communications medium (block 540). Because contention for medium access is not permitted, the contention algorithm 500 ends. Since contention was denied, no traffic was transmitted and the station must attempt the contention access again at a later time, when it is permitted to contend again. If no other station transmits any traffic, the station may contend again during the very next time slot using the same contention algorithm 500.

According to a preferred embodiment of the present invention, if a station was permitted to transmit into the medium but the transmission was not successful, e.g., it collided with transmissions from other stations, then the station will, after the medium becomes idle for a DIFS period, attempt to contend again, using the same contention algorithm 500, which may now have different TCPP and hence PP values according to blocks 370 and 375 in FIG. 3b and blocks 440 and 450 in FIG. 4. Each time the contention algorithm 500 is used, a new random number X is generated independently of any previously generated random numbers for use in block 520 and FIG. 5b.

An example of how to use probability-based contention access to improve network performance would be: If traffic in the network consisted of short data frames that readily fit within a single time slot and there were only one traffic category and if there were five stations in the network communicating, then the permission probability for the traffic category could be set to 0.20. Then statistically, during each idle slot in a sequence of five idle slots, one of the five stations would be permitted to access the medium. This shows an advantage of using probability-based contention access because as soon as an idle slot became available there was a good probability of it being used to transmit traffic successfully.

Figure 6A:
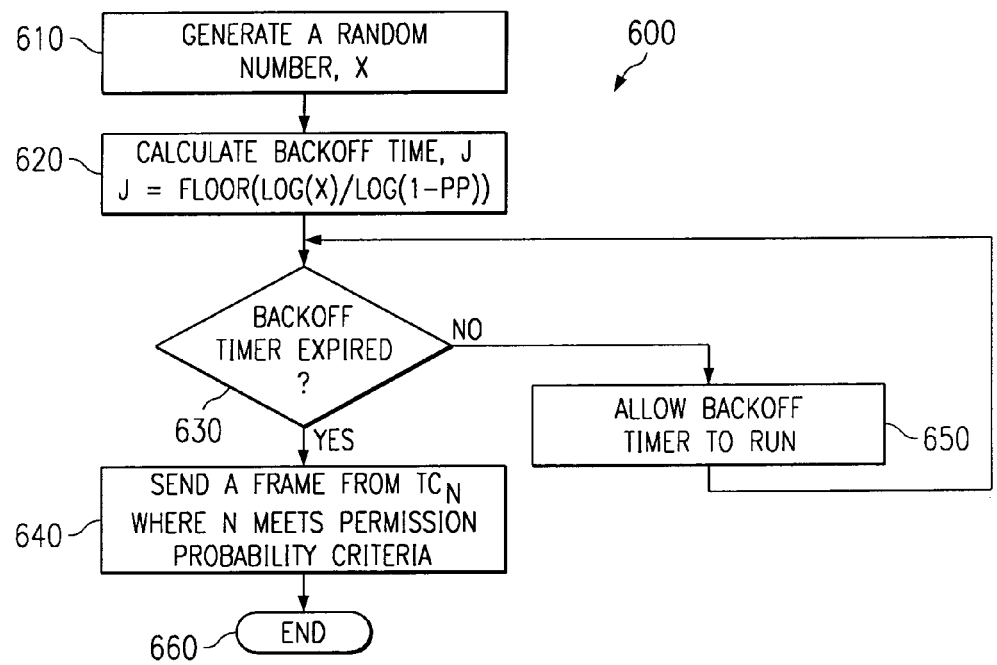
FIG. 6a is a diagram illustrating a backoff-based medium contention algorithm according to a preferred embodiment of the present invention.

Referring now to FIG. 6a, a block diagram illustrates a backoff-based medium contention algorithm 600 according to a preferred embodiment of the present invention. According to a preferred embodiment of the present invention, the contention algorithm 600 executes on each station with traffic to transmit. The contention algorithm 600 is present on each station in the network, but is only active on stations with traffic to transmit. The contention algorithm 600 is an example of a contention algorithm that would be used in blocks 380 from FIG. 3b and 460 from FIG. 4 to obtain access to the communications medium and to transmit data if the access was obtained.

The contention algorithm 600 begins with the contending station generating a random number, X (block 610). According to a preferred embodiment of the present invention, the random number, X, is generated from a random variable uniformly distributed over an interval [0, 1]. The random number, X, is then used to calculate a backoff time, J (block 620). The backoff time, J, is calculated using the expression:

$$J = \lfloor \log(X)/\log(1-PP) \rfloor$$

where $\lfloor Y \rfloor$ denotes the largest integer number not exceeding Y. According to a preferred embodiment of the present invention, the logarithm used in calculating the backoff time, J, is the logarithm base 10. However, a natural log may be used with equivalent results. For example, if X=0.33 and PP=0.45, then $$J = \lfloor \log(0.33)/\log(1-0.45) \rfloor =$$
$$\lfloor \log(0.33)/\log(0.55) \rfloor = \lfloor -0.48/-0.26 \rfloor = \lfloor 1.85 \rfloor = 1.0$$

If X=0.05 and PP=0.45, then J=5.0.

The backoff time, J, was placed into a backoff timer that counts down idle time slots. However, the backoff timer does not count down until the medium is idle for a DIFS. Once the backoff timer expires (block 630), the station transmits. The station sends traffic from a traffic category N where N is selected from the following criteria (block 640):

if $0 < C*X \leq TCPP_0$, then $N=0$; else if $\sum_{i=0}^{M-1} TCPP_i < C*X \leq \sum_{i=0}^{M} TCPP_i$, where $1 \leq M \leq 7$, then $N = M$, where $1 \leq M \ 7$, then N=M.
Here, $$C = \sum_{i=0}^{Z} TCPP_i, Z+1$$

is the number of traffic categories, and $TCPP_i$ are set to zero for traffic categories having no traffic to send from the station. The above expressions can be simpler stated as follows: Traffic in category N will be transmitted if C*X lies within an interval.

$$\left( \sum_{i=0}^{N-1} TCPP_i, \sum_{i=0}^{N} TCPP_i \right].$$

Figure 6B:
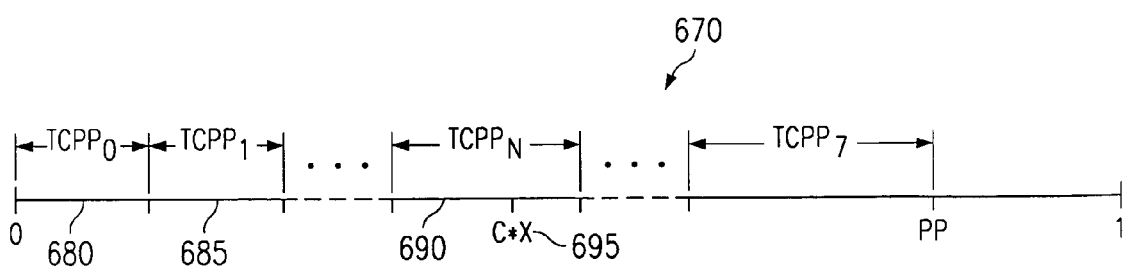
FIG. 6b is a diagram graphically illustrating an algorithm for selecting traffic from a particular traffic category to transmit according to a preferred embodiment of the present invention.

There is a special case for N=0, then the interval is (0, $TCPP_0$]. The criteria above are displayed in graphical form in FIG. 6b. After transmitting the traffic, the contention algorithm 600 ends (block 660).

According to a preferred embodiment of the present invention, if a station was permitted to transmit into the medium but the transmission was not successful, e.g., it collided with transmissions from other stations, the station will, after the medium becomes idle for a DIFS period, attempt to contend again, using the same contention algorithm 600, which may now have different TCPP and hence PP values for calculating a new backoff time according to blocks 370 and 375 in FIG. 3b and blocks 440 and 450 in FIG. 4. Each time the contention algorithm 600 is used, a new random number X is generated independently of any previously generated random numbers for use in block 620 and FIG. 6b.

Referring now to FIG. 7, a block diagram illustrates a hybrid controller (HC) 700 with hardware support for centralized contention access according to a preferred embodiment of the present invention. The HC 700 has a processor 710 that is responsible for assigning, maintaining, and updating permission probabilities for each traffic category that is supported in the network. The processor 710 stores the TCPPs in a memory 720.

The HC 700 has a network monitor 730 that is coupled to a communications medium 740. The network monitor 730 monitors the load on the medium and generates network performance metrics such as an amount of time the medium is in an idle state, an amount of time the medium is in a collision state, an amount of time the medium is in a successful transmission state, a number of frames successfully transmitted, a number of frames unsuccessfully transmitted, etc. The performance metrics generated by the network monitor 730 are used by the processor 710 to update the TCPPs. For example, if the ratio of medium idle time to medium collision time is either much less (<<)or much greater (>>) than one, then the adjustment to the TCPPs would be greater than the adjustment made when the ratio is only slightly less (<) or slight greater (>) than one.

The performance metrics may also be used to force updates of the TCPPs. According to another preferred embodiment of the present invention, the performance metrics are used to trigger an update of the TCPPs. For example, if the ratio of medium idle time to medium collision time lies outside a range (1−epsilon, 1+epsilon), where epsilon is a prespecified value, then the TCPPs are updated.

According to another preferred embodiment of the present invention, whenever the TCPPs need to be updated, an update flag (not shown) is asserted to notify the processor 710 that an update needs to be performed. The update flag may be asserted by a timer that expires (in the case of updates being performed at regular time intervals) or by the network monitor 730 when a performance metric falls out of a desired range (for updates that are performed at irregular time intervals). The processor 710 then will make adjustments to the TCPPs, either by a fixed amount that is prespecified or by a variable amount that is dependent on the performance metrics.

The communications medium 740 is shown in FIG. 7 as being a physical connection. However, according to a preferred embodiment of the present invention, the communications medium 740 may be any medium that is capable of transmitting data. Examples of different possible communications medium include, but are not limited to: wire (power line, telephone line, twisted pair, coaxial cable, multi-conductor wire, etc.), fiber optics (single mode and multimode), wireless (radio frequency, infrared, microwave, laser light, etc.).

Referring now to FIG. 8, a block diagram illustrates a station 800 with hardware support for both distributed and centralized contention access according to a preferred embodiment of the present invention. According to a preferred embodiment of the present invention, a station should be able to accept TCPPs from a centralized controller (centralized operation) or be able to generate its own TCPPs (distributed operation). The station 800 displayed in FIG. 8 is capable of operation under either mode.

The station 800 has a processor 810 that is responsible for receiving or assigning and maintaining TCPPs among other things. The processor 810 is coupled to a memory 820 that stores the TCPPs.

Also coupled to the processor 810 is a medium contention unit 830. The medium contention unit 830 is responsible for contending for access to a communications medium 840. According to a preferred embodiment of the present invention, there are several ways to contend for access to the communications medium 840, including probabilistic contention and contention using adaptive backoff. Once the station 800 obtains access to the communications medium 840, it transmits data using a transmitter 850 that is coupled to both the processor 810 and the memory 820.

In order to support a distributed access mechanism, the station also has a network monitor 860. The network monitor 860 works in a similar manner as the network monitor 730 described in FIG. 7. The network monitor 860 maintains performance metrics of the network to help assist in making adjustments to the TCPPs and to know when to force updates of the same.

According to another preferred embodiment of the present invention, whenever the TCPPs need to be updated, an update flag (not shown) is asserted to notify the processor 810 that an update needs to be performed. The update flag may be driven by a timer that expires (in the case of updates being performed at regular time intervals) or by the network monitor 860 when a performance metric falls out of a desired range (for updates that are performed at irregular time intervals).

Referring now to FIG. 9, a time-space diagram 900 illustrates the operation of the probability-based contention algorithm according to a preferred embodiment of the present invention. The time-space diagram 900 displays traffic frames on the communications medium as a function of time.

The time-space diagram 900 begins at a beginning of a communications medium superframe. The communications medium superframe's beginning is marked by a target beacon transmission time (TBTT) on the communications medium. A beacon frame 905 is typically transmitted at or after a TBTT by an access point (or hybrid controller) and is used to synchronize all stations to a common time base and prepare all stations for medium access. The beacon frame 905 may also be used to broadcast the updated TCPPs to stations inside the BSS.

According to the IEEE 802.11 technical specifications, a superframe may be broken up into two parts, a contention-free period and a contention period. The contention-free period may be of zero duration or up to a specified maximum duration. The contention period lasts the remainder of the superframe. The end of the contention-free period is marked with a CF-end frame 910.

Block 915 displays that the communications medium is not idle for a period greater than one Distributed Coordinating Function (DCF) Inter-frame Space (DIFS), which is the minimum amount of time that a station must wait on an idle communications medium before it can contend for the medium. Highlighted area 920 displays an idle DIFS period on the communications medium.

With the communications medium idle for one DIFS period, a station that has traffic to transmit can begin to contend for access. According to a preferred embodiment of the present invention, the station can contend for access one time per idle slot 925. FIG. 9 displays that the station attempts to content for four idle slots before some other station obtains access to the medium (shown as block 930), at which time, the station stops its attempts at obtaining access.

After a second DIFS medium idle interval, the station attempts to obtain access to the medium once again. After a few attempts, the station obtains access to the medium and is able to transmit some a traffic frame (block 935). A dotted block 940 displays an acknowledgment the station expects to, but does not, receive from the addressed station of its transmitted frame. That is, the transmissions in block 935 failed.

A third DIFS idle interval opens up and the station attempts to obtain access again, but it quits after several idle slots pass when it determines that the end of a superframe is arriving and there is not sufficient time to transmit any traffic that it has and to receive the corresponding acknowledgment. The process is repeated when the next superframe begins.

Algorithms that are adaptive have the ability to change the way that they behave depending on the conditions in which they operate. As discussed above, adaptive algorithms that dynamically reassign TCPPs and the amount of backoff time depending on the load on the communications medium allow the users in the network to change the way in which they communicate to take the best advantage of the current condition. The TCPP and the backoff time are just two examples of network access parameters that can be changed to adjust the behavior of the users as a function of the load on the medium.

According to another preferred embodiment of the present invention, another network access parameter that may be changed to adjust the behavior of the users as the load on the medium changes is the size of the contention window. The contention window, as discussed earlier, is a range from which a random number is selected. This number is then used to set the backoff timer. An example of a contention window is the window [0, CW) used to select a backoff time for the initial contention for an idle communications medium.

If the contention window is enlarged, for example, to [0, 2*CW), then the average amount of medium idle time that a user will need to wait before attempting a transmission is CW, rather than ½ CW of the original contention window, [0, CW). The effect of enlarging the contention window is to decrease the overall load on the medium. If the contention window is decreased, then the overall load on the medium will be increased.

According to another preferred embodiment of the present invention, another network access parameter that may be changed to adjust the behavior of the users as the load on the medium changes is the value of the DIFS period. According to the IEEE 802.11 technical standards, the DIFS period is the amount of time that a user must wait after the medium becomes idle before it attempts to contend for the medium. The DIFS period is a fixed value and is crucial to the proper operation of the network. However, if the DIFS period were varied, as long as the DIFS period not be smaller than a minimum value ensuring proper network function, then the amount of time that a user would need to wait after the communications medium becomes idle could be adjusted, depending on medium load.

According to a preferred embodiment of the present invention, the DIFS period would be varied depending on the priority of the traffic category. Traffic categories with higher priorities will be assigned smaller DIFS values and therefore would be required to wait for a shorter amount of time after the communications medium becomes idle. Lower priority traffic categories would be assigned larger DIFS values, forcing them to wait an extended amount of time. According to another preferred embodiment of the invention, other time intervals such as SIFS, PIFS, EIFS (extended inter-frame space) can also be varied depending on the priority of the traffic category. As discussed above, as long as the SIFS, PIFS, EIFS time intervals are not adjusted so that they are smaller than minimum values required for proper network function, adjusting the time intervals will not have an adverse effect on the network.

In general, network traffic load is controlled by various network access parameters. These access parameters determine when a station can begin to contend for access to the shared communications medium. As specified by the IEEE 802.11 technical standard, the access parameters are static and cannot change to reflect network conditions. The access parameters are the same for all traffic in the network, regardless if the traffic is time-sensitive information or if it is a time-tolerant file transfer.

The present invention discloses a method that monitors the current network condition and varies the access parameters to increase network performance. The present invention also makes use of prioritized network traffic to ensure that high-priority network traffic receive preferential treatment relative to lower priority network traffic.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptively controlling network traffic on a communications network with a shared communications medium, said method comprising:
    determining traffic category permission probabilities;
    calculating an overall permission probability, PP;
    contending for access to the shared communications medium, comprising:
        determining if a contending station is permitted to transmit; and
        transmitting traffic from an appropriate traffic category;
    updating the traffic category permission probabilities by an amount that is proportional to how far a ratio of an amount of time the medium is in an idle state to an amount of time the medium is in a collision state is from optimal;
    determining updated traffic category permission probabilities; and
    repeating the above steps until buffered traffic is transmitted wherein there are a plurality of traffic categories, and a traffic category permission probability is assigned for each traffic category and the calculating an overall permission probability, PP, is a summation of the traffic category permission probabilities assigned to each traffic category.

2. The method of claim 1, wherein updating traffic category permission probabilities comprises a centralized controller assigning the traffic category permission probabilities.

3. The method of claim 1, wherein the shared communications medium is shared by a plurality of stations, and wherein updating traffic category permission probabilities comprises each station assigning the traffic category permission probabilities.

4. The method of claim 1, wherein the shared communications medium is shared by a plurality of stations, and wherein the calculating overall permission probability step is performed by stations with traffic to transmit.

5. The method of claim 1, wherein the determining step comprises:
    generating a random number, X; and
    granting the contending station permission to transmit only if the random number, X, is less than or equal to the overall permission probability, PP.

6. The method of claim 1, wherein the contending for access step comprises:
    setting a backoff timer;
    determining if a contending station can transmit; and
    sending traffic from an appropriate traffic category.

7. The method of claim 6, wherein the setting a backoff timer comprises:
    calculating a backoff time based on the random number, X; and
    setting the backoff timer to the backoff time.

8. The method of claim 7, wherein the calculating a backoff time uses the formula:

$$J=[\log(X)/\log(1-PP)],$$

where [Y] denotes a largest integer number not exceeding Y and PP is the overall permission probability.

9. The method of claim 6, wherein the determining step comprises:
    freezing a backoff timer when the shared communications medium is busy;
    decrementing a backoff timer after the shared communications medium is idle for a point coordinating function inter-frame space period; and
    waiting until the backoff timer expires.

10. The method of claim 6, wherein the sending traffic from an appropriate traffic category comprising sending traffic from traffic category N, where N meets the criteria:

if $0 < C*X \leq TCPP_{+0}$, then $N=$;else if $\sum_{i=0}^{M-1} TCPP_i < C*X \leq \sum_{i=0}^{M} TCPP_i$, where $1 \leq M \leq 7$, then $N = M$, and where $$C = \sum_{i=0}^{Z} TCPP_i, Z+1$$

is a total number of traffic categories, and $TCPP_1$, is the traffic category transmission probability for traffic category i and is set to zero if traffic category i has no traffic to send from the contending station.

11. The method of claim 1, wherein the determining updated traffic category permission probabilities occurs at regular fixed intervals of time.

12. The method of claim 1, wherein the shared communications medium is shared by a plurality of stations, and wherein the determining traffic category updated traffic category permission probabilities is performed at each station with traffic to transmit.

13. The method of claim 1, wherein the determining updated traffic category permission probabilities is performed at a centralized controller.

14. The method of claim 1, wherein the determining updated traffic category permission probabilities step occurs at irregular time intervals and is triggered by a network performance metric.

15. The method of claim 14, wherein the network performance metric is a ratio of an amount of time the medium is in an idle state to an amount of time the medium is in a collision state is outside of an interval (1−epsilon, 1+epsilon), where epsilon is a predetermined value.

16. A method for adaptively controlling network traffic on a communications network with a shared communications medium, said method comprising:
   generating a random number, X;
   determining traffic category permission probabilities;
   calculating an overall permission probability, PP;
   determining if a contending station is permitted to transmit;
   sending traffic from traffic category N, where N meets the following criteria:

if $0 \leq X \leq TCPP_{+0}$, then $N=0$; else if $\sum_{i=0}^{M-1} TCPP_i < X \leq \sum_{i=0}^{M} TCPP_i$, where $1 \leq M \leq 7$, then $N = M$, and where $TCPP_1$ is the traffic category permission probability for traffic category i and is set to zero if traffic category i has no traffic to send from the contending station;
   determining updated traffic category permission probabilities; and
   repeating the above steps until buffered traffic is transmitted wherein there are a plurality of traffic categories, and a traffic category permission probability is assigned for each traffic category and the calculating an overall permission probability, PP, is a summation of the traffic category permission probabilities assigned to each traffic category.

* * * * *